(12) United States Patent
Merdinger et al.

(10) Patent No.: US 9,929,859 B2
(45) Date of Patent: *Mar. 27, 2018

(54) ACCOUNT ASSET PROTECTION VIA AN ENCODED PHYSICAL MECHANISM

(71) Applicant: Go Daddy Operating Company, LLC, Scottsdale, AZ (US)

(72) Inventors: Richard Merdinger, Iowa City, IA (US); Christopher Ambler, Palo Alto, CA (US); James M. Bladel, LeClaire, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/877,724

(22) Filed: Oct. 7, 2015

(65) Prior Publication Data

US 2017/0104591 A1    Apr. 13, 2017

(51) Int. Cl.
| | |
|---|---|
| *H04L 29/06* | (2006.01) |
| *H04L 9/08* | (2006.01) |
| *G06F 21/00* | (2013.01) |
| *G06F 21/30* | (2013.01) |
| *G06Q 10/00* | (2012.01) |

(52) U.S. Cl.
CPC ............ *H04L 9/0819* (2013.01); *G06F 21/00* (2013.01); *G06F 21/30* (2013.01); *G06Q 10/00* (2013.01)

(58) Field of Classification Search
CPC ............................ G06K 7/1417; H04L 9/0819
See application file for complete search history.

(56) References Cited

U.S. PATENT DOCUMENTS

| | | |
|---|---|---|
| 5,933,829 A | 8/1999 | Durst et al. |
| 7,130,878 B2 | 10/2006 | Parsons et al. |
| 7,418,471 B2 | 8/2008 | King et al. |
| 8,583,612 B2 | 11/2013 | Bennett |
| 2002/0026439 A1 | 2/2002 | Monroe |
| 2004/0199608 A1 | 10/2004 | Rechterman et al. |
| 2006/0101113 A1 | 5/2006 | Lemson et al. |
| 2009/0254545 A1 | 10/2009 | Fisken |

*Primary Examiner* — Tri Tran
(74) *Attorney, Agent, or Firm* — Quarles & Brady LLP

(57) ABSTRACT

Systems and methods of the present invention provide for one or more server computers communicatively coupled to a network and configured to: receive a request for a physical certificate authenticating a user to transfer a domain name, as well as a domain name and domain name transfer instructions; print the physical certificate, including a QR code encoding a user id, the domain name, an EPP key and the transfer instructions; lock the domain name account against modification; receive a request to execute a domain name transfer; scan the user id, the domain name, the EPP key and the transfer instructions encoded within the QR code; unlock an administrative function of the account; authenticate, via the EPP key, the domain name transfer; and execute the domain name transfer.

18 Claims, 6 Drawing Sheets

```
File  Edit  Tools         ⇐ ⇒
```

Domain Name Control Panel

Domain Name Registration:
Please selet an available domain name to register: | example.com |

[X] Require physical mechanism (certificate, USB key, etc.) to access account, domain name changes, and/or transactions associated with this account and/or its user id Please provide an email address or phone number to contact you to request the physical mechanism:

| me@example.com |

Transactions authorized by you to be applied on receipt of the secure physical mechanism:

[X] Domain Name Registration

[X] Domain Name Transfer

[X] Update WHOIS, Name Server or other DNS Settings

[X] Register my domain name to a third party intermediary organization

[X] I acknowledge my contractual obligations to present the physical mechanism to apply these changes

FIG. 4

Physical Certificate for Domain Modification

This physical certificate has been issued upon the registration of EXAMPLE.COM and includes access to the following domain name administrative functions for EXAMPLE.COM:

1. Apply for a domain name transfer
2. Perform an inter-registrar transfer
3. Change the registrant
4. Perform a routine update of WHOIS or name server information To access these domain name administrative functions, scan the QR code below:

FIG. 6

ACCOUNT ASSET PROTECTION VIA AN ENCODED PHYSICAL MECHANISM

FIELD OF THE INVENTION

The present invention generally relates to the field of electronic account, asset and transaction security, and specifically to the field of generating a physical security mechanism, such as a certificate, encoding a user id, asset id and modification instructions for implementing modifications to, and securing, the account, asset and/or transaction. An intermediary organization may hold the physical security mechanism until the user elects to implement the modification instructions.

SUMMARY OF THE INVENTION

The present invention provides systems and methods comprising one or more server computers configured to receive a request for a physical certificate authenticating a user to transfer a domain name, as well as a domain name and domain name transfer instructions; print the physical certificate, including a QR code encoding a user id, the domain name, an EPP key and the transfer instructions; lock the domain name account against modification; receive a request to execute a domain name transfer; scan the user id, the domain name, the EPP key and the transfer instructions encoded within the QR code; unlock an administrative function of the account; authenticate, via the EPP key, the domain name transfer; and execute the domain name transfer.

In another embodiment, the present invention may provide systems and methods comprising one or more server computers configured to receive a request for a physical certificate authenticating a user to transfer a domain name, as well as a domain name and domain name transfer instructions and a request to register the domain name to a third party; register the domain name to the third party and update WHOIS; print the physical certificate, including a QR code encoding a user id, the domain name, an EPP key and the transfer instructions; lock the domain name account against modification; receive a request to execute a domain name transfer; scan the user id, the domain name, the EPP key and the transfer instructions encoded within the QR code; unlock an administrative function of the account; authenticate, via the EPP key, the domain name transfer; and execute the domain name transfer.

The above features and advantages of the present invention will be better understood from the following detailed description taken in conjunction with the accompanying drawings.

BRIEF DESCRIPTION OF THE DRAWINGS

FIG. 4 illustrates an example control panel for account asset protection via a physical mechanism.

FIG. 6 is an example of a certificate generated within an embodiment of account asset protection via a physical mechanism.

DETAILED DESCRIPTION

Figure 1:
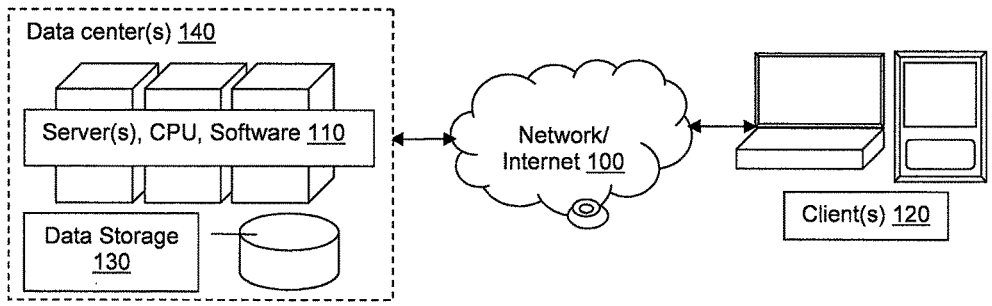
FIG. 1 illustrates a possible system for account asset protection via a physical mechanism.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as websites. The combination of all the websites and their corresponding web pages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Website browsers are able to locate specific websites because each website, resource, and computer on the Internet has a unique Internet Protocol (IP) address.

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses.

As the Internet has grown in size and influence, Domain names have become a digital asset with significant financial value. The high value associated with domain names have caused some unscrupulous individuals to hijack the registration and control of domain names. Domain name hijacking or domain name theft may involve changing the registration of a domain name without the permission of its original registrant.

As non-limiting examples, a domain name hijacker may acquire personal information about the actual domain owner, possibly from domain name registry records, and impersonate them in order to persuade the domain registrar to modify the registration information and/or transfer the domain name to another registrar (the hijacker), who would then gain full control of the domain name.

Domain name hijacking has created a need for increased security when a domain name is registered, renewed, transferred between registrars or registrants, and/or when any other administrative functions affecting the domain name are needed. Increased security for such functions may require a domain name change key, possibly comprising an authorization code to ensure that the person requesting such change is in fact the registrant of the domain name. Change keys may identify a valid registrant of a domain name. and may represent a uniform means to protect domain names by requiring verification of the valid registrant to prevent hijacking by ensuring that only the rightful domain name registrant can control domain name administrative functions.

As disclosed herein, change keys may also refer to and include a domain name authorization code, an auth code, a domain name transfer key, an Extensible Provisioning Protocol (EPP) key, or any other known or proprietary security code used to prevent a domain name from being hijacked. It should be noted, however, that the synonymous use of these terms and/or phrases is for simplicity within the current disclosure. The application of each of these terms and/or phrases, as used interchangeably, should still retain any characteristics or subtle differences between them, as known in the art.

A change key may be generated by a registrar and used to "unlock" the administrative functions associated with a domain name. For example, the change key may support transferring any domain from one registrar to another. Although the change key may help identify the domain name registrant and may be required for a domain name transfer, it does not necessarily indicate approval of the transfer.

Change keys may be generated and transmitted via the EPP—a protocol for allocating functions for objects, such as domain names, within registries over the Internet. EPP may often use a simple text string, but may be based on a structured, text-based format, such as Extensible Markup Language (XML). EPP, or any other security measures known in the art may provide communication between domain name registries, domain name registrars and domain name registrants, creating a means for the EPP key to be transmitted between these entities. Currently, the typical means for transmitting the domain change key is to send the EPP key via email to the registrant, who utilizes the key as part of an EPP transfer command.

EPP keys, as a non-limiting example of change keys, may comprise a unique 6 to 32 character code assigned to a domain. They are designed to prevent fraudulent or unauthorized transfers. This code is an extra safety feature, similar to a credit card verification code or PIN for a domain, that helps ensure that the customer transferring the domain is indeed the owner of that domain.

As noted above, domain name hijacking and unauthorized changes to domain names are a common and pervasive security risk. There may be multiple weaknesses in presently existing systems and methods for providing security for such domain name administration. Currently, registrants may request auth change keys such as EPP keys in order to change their registered domain names.

Registrars respond to such requests by either using a simple password before disclosing the change keys within a user account, or they email the change key to a single, known email address used by the registrant. In these situations, the user account may be hacked, or a man in the middle email hacker (or anyone else with access to the email account) may have access to the change key sent in this manner.

Thus, sending change keys or access to change keys by any electronic means creates a potential security issue. For example, if the change keys or means to access the change keys are sent via email or other electronic transmissions, a malicious user may steal a domain name by hacking a user's email account, admin account, or additional electronic transmissions or accounts, and determining the change keys required to transfer the domain name account into the malicious user's possession. The malicious user may also perform an inter-registrar transfer, change of registrant, routine update of WHOIS or name server information, etc. to gain possession of the domain name. Access to the electronic account is therefore equivalent to access to the domain name. Even in situations with a more advanced password, if the password is included in any type of electronic transmission or account, the transmission may be intercepted or hacked, giving the hacker access to the information needed to modify and transfer the domain name account. Loss of the domain name may create further problems for the domain name owner, since the domain name owner may lose all assets associated with that domain name, possibly including a website, a business and/or any intellectual property rights such as trademarks associated with the domain name.

Optimal solutions to these problems may include means for creating ownership of an account, asset or transaction that cannot be hijacked. In the disclosed embodiments, any electronic account, asset or transaction may exist in association with a physical mechanism such as a certificate or USB key. The disclosed systems and methods may encode access credentials necessary to access the account or modify the assets or related transactions. In some embodiments, the disclosed software may identify a user of an account and/or a domain name, as well as modification instructions for either, and store this information as a-block of data encoded within a bar code, such as a Quick Response (QR) code.

This encoded block of data may be printed or otherwise affixed to a physical piece of paper, such as a certificate, or may be stored on a physical electronic device with a portable memory such as a USB key, memory card (e.g., SD card) or a cell phone.

Several different environments may be used to accomplish the method steps of embodiments disclosed herein. FIG. 1 demonstrates a streamlined example and FIG. 2 demonstrates a more detailed example of an environment including a system and/or structure that may be used to accomplish the methods and embodiments disclosed and described herein. Such methods may be performed by any central processing unit (CPU) in any computing system, such as a microprocessor running on at least one server 110 and/or client 120, and executing instructions stored (perhaps as scripts and/or software, possibly as software modules/components) in computer-readable media accessible to the CPU, such as a hard disk drive on a server 110 and/or client 120.

The example embodiments shown and described herein exist within the framework of a network 100 and should not limit possible network configuration or connectivity. Such a network 100 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 110 and at least one client 120 may be communicatively coupled to the network 100 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The example embodiments herein place no limitations on whom or what may comprise users. Thus, as non-limiting examples, users may comprise any individual, entity, business, corporation, partnership, organization, governmental entity, and/or educational institution that may have occasion to organize/import contacts and/or send marketing campaigns.

Server(s) 110 may comprise any computer or program that provides services to other computers, programs, or users either in the same computer or over a computer network 100. As non-limiting examples, the server 110 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof) and may be used, for example to provide access to the data needed for the software combination requested by a client 120.

The server 110 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The client 120 may be any computer or program that provides services to other computers, programs, or users either in the same computer or over a computer network 100. As non-limiting examples, the client 120 may be an application, communication, mail, database, proxy, fax, file, media, web, peer-to-peer, or standalone computer, cell phone, personal digital assistant (PDA), etc. which may contain an operating system, a full file system, a plurality of other necessary utilities or applications or any combination thereof on the client 120. Non limiting example programming environments for client applications may include JavaScript/AJAX (client side automation), ASP, JSP, Ruby on Rails, Python's Django, PHP, HTML pages or rich media like Flash, Flex or Silverlight.

The client(s) 120 that may be used to connect to the network 100 to accomplish the illustrated embodiments may include, but are not limited to, a desktop computer, a laptop computer, a hand held computer, a terminal, a television, a television set top box, a cellular phone, a wireless phone, a wireless hand held device, an Internet access device, a rich client, thin client, or any other client functional with a client/server computing architecture. Client software may be used for authenticated remote access to a hosting computer or server. These may be, but are not limited to being accessed by a remote desktop program and/or a web browser, as are known in the art.

The user interface displayed on the client(s) 120 or the server(s) 110 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in the accompanying drawings, Touch interfaces, Conversational Interface Agents, Live User Interfaces (LUI), Command line interfaces, Non-command user interfaces, Object-oriented User Interfaces (OOUI) or Voice user interfaces. The commands received within the software combination, or any other information, may be accepted using any field, widget and/or control used in such interfaces, including but not limited to a text-box, text field, button, hyper-link, list, drop-down list, check-box, radio button, data grid, icon, graphical image, embedded link, etc.

The server 110 may be communicatively coupled to data storage 130 including any information requested or required by the system and/or described herein. The data storage 130 may be any computer components, devices, and/or recording media that may retain digital data used for computing for some interval of time. The storage may be capable of retaining stored content for any data required, on a single machine or in a cluster of computers over the network 100, in separate memory areas of the same machine such as different hard drives, or in separate partitions within the same hard drive, such as a database partition.

Non-limiting examples of the data storage 130 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 130 may comprise any collection of data. As non-limiting examples, the data storage 130 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

The server(s) 110 or software modules within the server(s) 110 may use query languages such as MSSQL or MySQL to retrieve the content from the data storage 130. Server-side scripting languages such as ASP, PHP, CGI/Perl, proprietary scripting software/modules/components etc. may be used to process the retrieved data. The retrieved data may be analyzed in order to determine the actions to be taken by the scripting language, including executing any method steps disclosed herein.

The software modules/components of the software combination used in the context of the current invention may be stored in the memory of—and run on—at least one server 110. As non-limiting examples of such software, the paragraphs below describe in detail the software modules/components that make up the software combination. These software modules/components may comprise software and/or scripts containing instructions that, when executed by a microprocessor on a server 110 or client 120, cause the microprocessor to accomplish the purpose of the module/component as described in detail herein. The software combination may also share information, including data from data sources and/or variables used in various algorithms executed on the servers 110 and/or clients 120 within the system, between each module/component of the software combination as needed.

A data center 140 may provide hosting services for the software combination, or any related hosted website including, but not limited to hosting one or more computers or servers in a data center 140 as well as providing the general infrastructure necessary to offer hosting services to Internet users including hardware, software, Internet web sites, hosting servers, and electronic communication means necessary to connect multiple computers and/or servers to the Internet or any other network 100.

In the context of the current invention, network 100 may be configured to provide communications, via network connections, between one or more domain name registries, one or more domain name registrars, one or more domain name registrants and/or one or more users of the disclosed system. These network connections may be configured to handle EPP; as well as email, SMS and/or social media transmission and reception. Specifically, these network connections may provide means to request and receive the disclosed change keys.

Figure 2:
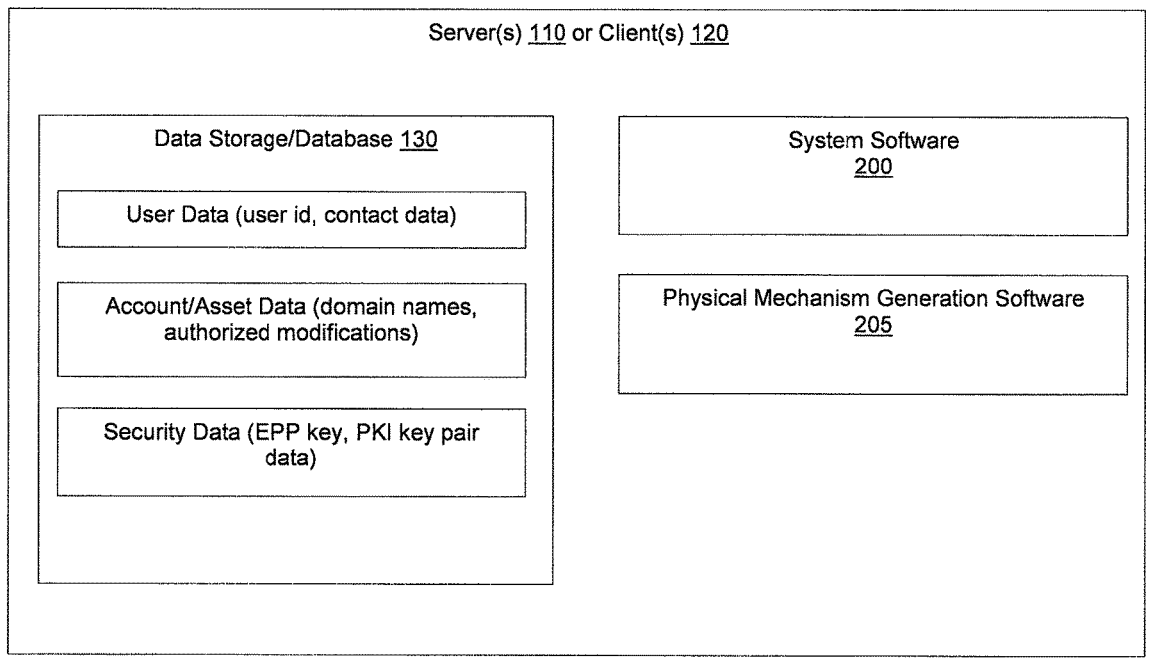
FIG. 2 illustrates a more detailed possible system for account asset protection via a physical mechanism.

FIG. 2 shows a more detailed example embodiment of an environment for the systems, and for accomplishing the method steps, disclosed herein. As non-limiting examples, all disclosed software modules 200, 205 may run on one or more server(s) 110 and may include one or more user interfaces generated by the server(s) 110 and transmitted to and displayed on the client(s) 120. The user interface(s) may be configured to receive input from the user and transmit this input to the server(s) 110 for the administration and execution of the software 200, 205, using data in data storage 130 associated with the software modules 200, 205. Thus, the disclosed system may be configured to execute any or all of the method steps disclosed herein.

Figure 3:
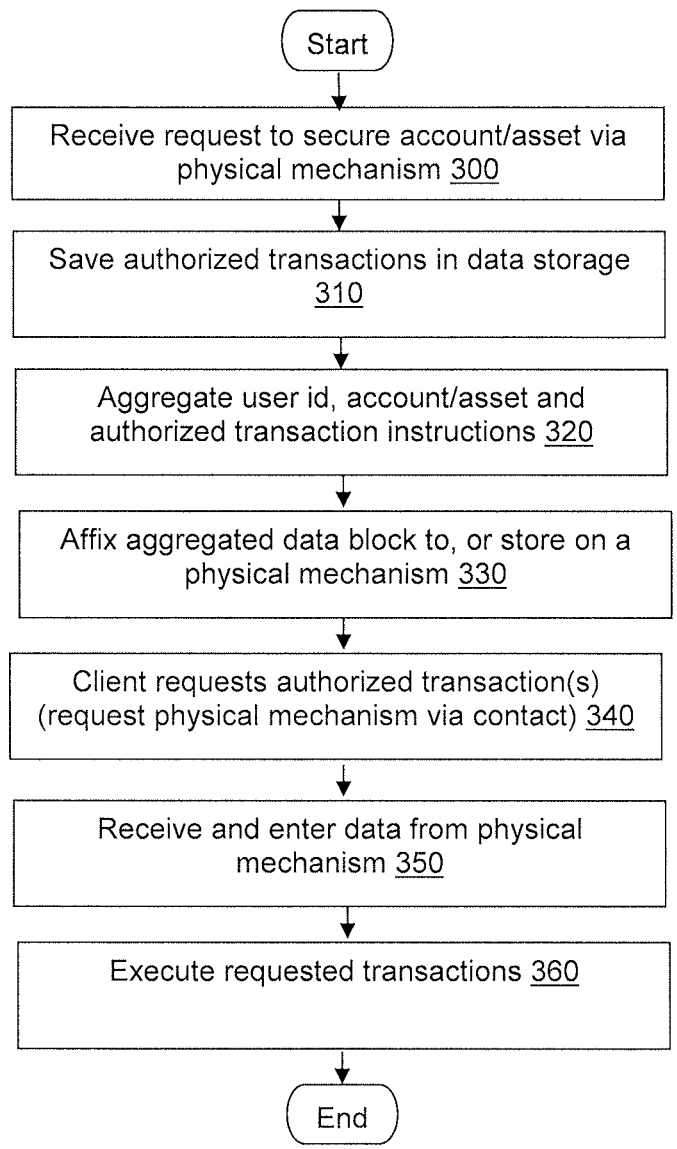
FIG. 3 illustrates a flow diagram representing steps for account asset protection via a physical mechanism.

As seen in FIG. 3, the disclosed invention may provide a user's accounts assets and/or transactions with additional security against social engineering, domain hijacking, etc. For example, the disclosed invention may provide additional security within a domain name account to authenticate a user before transferring a domain name to another user. To accomplish this, the disclosed invention may require a physical mechanism (e.g., a certificate or encoded USB key) storing a block of data authenticating ownership of the account or requested asset in order to access the account and/or execute the requested transaction.

FIG. 4 further demonstrates that during setup of an account (e.g., domain name account setup and/or domain name registration), a user may request that the security provided by the disclosed invention be applied to the account, the asset associated with the account (e.g., the domain name), or any transactions associated with the asset (e.g., transferring the domain name to another user). The setup and/or request may include an identification for the user (user id), possibly including identification of contact information for the user, identification of the asset (e.g., domain name), and one or more instructions for authorized transactions for the account or asset, selected by the user from the control panel, to be secured by the disclosed invention. The request may be received from the client 120 via a control panel such as that seen in FIG. 4. and transmitted to one or more servers 110 operated by an authentication authority, such as a domain name registrar.

Server(s) 110 may receive the request (Step 300), and store the asset identification and the one or more selected/authorized transactions in data storage 130 (Step 310). The authorized transactions may be stored as data records, and may be stored in association with the user id and the asset identification (e.g., instructions, stored in association with the user id and the domain name, to transfer a domain name to a new user).

Server(s) 110 may aggregate the user id, the asset and the authorized transaction instructions into a block of data (Step 320). This data block may be affixed to or stored on a physical mechanism (Step 330). For example, the user id, domain name and all instructions for transferring the domain name as authorized by the user, may be printed on a certificate or may be stored on a USB key, which may be physically delivered to the user that requested the transactions.

In embodiments where the asset is a domain name, a domain name change key, such as an EPP key may be generated and stored at the registry for the domain name. This change key may be affixed to or stored on the physical mechanism (e.g., displayed/affixed on the certificate and/or stored within the USB key in the examples above). To increase security, the authentication authority/registrar may generate a random EPP key stored in association with the original change key stored at the registry, to be matched to the original EPP key when presented. In addition, the change key, and/or the entire data block, may be encrypted using a PKI encryption, possibly including a key pair, as is known in the art.

In some embodiments, the data block may be encoded as a machine readable optical label (e.g., a UPC code, QR code or any other bar code), storing the data block in a form that needs to be scanned in order to transfer the data in the data block to server(s) 110. The machine readable optical label may be affixed to or stored on the physical mechanism (e.g., displayed/encoded on a certificate or stored as an image on a USB key).

To initiate the authorized transactions (e.g., domain name transfer), the user may log in, possibly using a username and password to authenticate themselves, to a control panel software hosted on server(s) 110 and operated by the authentication authority/registrar. The user may request one or more of the authorized transactions (Step 340). In some embodiments, the software may access data storage 130 and confirm that the authorized transactions are valid for the user and asset. In some embodiments, the software may then access the contact information for the user and transmit a notice that the user must send the physical mechanism to the authentication authority prior to the transaction being complete.

The user may then send the physical mechanism to the authentication authority, and when received, the authentication authority may scan or otherwise receive data entry of the information affixed to or stored within the physical mechanism (Step 350). Where applicable, the PKI key pair may be applied to decrypt the data block. Where the asset is a domain name, the change key, possibly an EPP key may be identified and, if a random EPP key was generated at the registrar, it may be matched to the original EPP key. The authorized transactions may then be performed in relation to the account or asset (Step 360). Where the asset is a domain name, prior to performing the transactions, the change key at the registry may be applied to authenticate and authorize the transaction. In some embodiments, server(s) 110 may generate a new physical mechanism, possibly including a record of transactions performed and any new authorized transactions, and send it to the user.

Returning to Step 300 in FIG. 3, server(s) 110 may receive a request for the physical mechanism used to authenticate the user and storing the instructions to perform the disclosed services. These servers 110 may be hosted by any entity, possibly a hosting provider, a domain name registrar, a website development company, any other software service provider or any combination thereof. To manage users of such a system, including individuals or organizations, server (s) 110 may host and run a user administration program such as GoDaddy's My Account control panel for managing hosting and domain names, as a non-limiting example.

FIG. 4 shows an example of such a control panel/user interface. A user of the disclosed invention may access this control panel after being authenticated, possibly after entering a user name and password. Data storage 130 may also store contact information (e.g., a phone number or email address) in association with the user account running the control panel. This contact information may be used to notify a user when a physical mechanism is required to execute a requested and authorized transactions.

As seen in FIG. 4 the control panel may also be used for registering a domain name. In this example embodiment, during domain name registration, the user may select the additional security provided by the disclosed service via the control panel. In addition to selecting this service, the user may specify which authorized transactions to associate with the physical instrument. In the example in FIG. 4, these transactions may include domain name transactions, including registration, transfer, inter-registrar transfer, sale, change of registrant, proof of ownership, routine update of WHOIS, name server settings or DNS settings, etc.

In FIG. 4, the user may acknowledge contractual obligations associated with using the physical mechanism to secure their information. The user's request of the service may comprise a contract between the user and an authenticating authority, such as a registrar, that the user will not be able to access a user account, and/or make changes within that account (domain name updates, in this example), without receipt and verification of the physical mechanism. The contract may acknowledge, programmatically and/or contractually, that the user acknowledges that no changes to the account or transactions within the account will be made absent authentication via the proof of ownership of the physical mechanism.

As seen in FIG. 4, the user may request that the domain name be registered by a third party intermediary organization. For example, a domain name registrant may want to protect domain name administration from unscrupulous individuals, while avoiding potential policy problems with any government or quasi-governmental policy body such as ICANN, which might trump the obligations of any administrator of the disclosed system.

The disclosed invention may be configured in such a way that it would transcend any policy changes or any rights that the user/registrant would have under any such government or quasi-governmental policy body, while still providing the security provided by the disclosed system. The intermediary organization may register the user's requested domain name. Once the domain name is registered to this intermediary organization, the organization effectively becomes the domain name registrant. The organization may then license use of the domain name back to the customer that requested the registration. This license agreement would be in exchange for payment or other consideration provided for the disclosed services. The intermediary organization would generate and issue the physical mechanism, which locks the domain name in association with a customer's account until the customer presents or provides the physical mechanism to unlock the accounts and/or assets, such as specific domain names.

Figure 5:
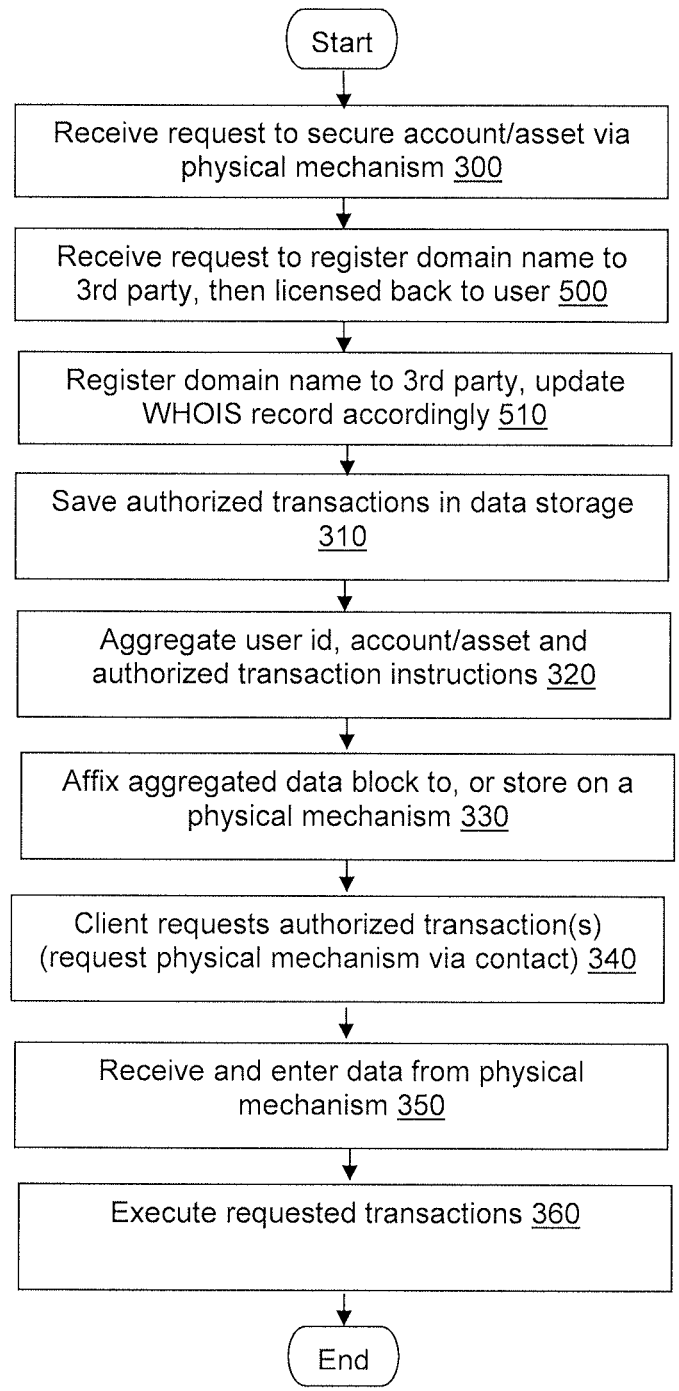
FIG. 5 illustrates a flow diagram representing steps for account asset protection via a physical mechanism.

Thus, as seen in FIG. 5, the steps demonstrated in FIG. 3 may be applied to the arrangement with the intermediary organization. However, prior to generating the physical mechanism, the user may request that the domain name be registered in the name of the intermediary organization, then licensed back to the user (Step 500). On receipt of this request, the server(s) 110 for the intermediary third party organization may register the domain name to the intermediary third party, and the intermediary third party may license the domain name back to the requesting user. All appropriate domain name records, including WHOIS records, may be updated to reflect that the intermediary third party organization is the registrant of the domain name (Step 510).

The product or service provided by the intermediary organization may create an account for the customer, separate from their domain name account, and may inform the customer that this separate account has been established. The account may comprise one or more domain names, but may be locked, so that the customer may never have access the locked domain names until such time as they're ready to request access to update one or more of the domain names.

To initiate these updates, the customer may be required to send back the physical mechanism. Once the customer demonstrates ownership of the physical mechanism, the intermediary service would give the customer access to the account and any assets associated with the physical mechanism, possibly for a limited time as described below. Specifically, once the physical mechanism is received and processed by the organization's server(s) 110, the customer's account may be unlocked to affect these changes. In some embodiments, the domain names/account may be unlocked for a specific period of time for the customer to make changes (e.g., 24 hours).

This arrangement would centralize ownership of the asset, and therefore the ability to make account changes, within the organization, and by virtue of the organization's structure, the organization would be made immune from any policy issues. In some embodiments, the intermediary service organization may perform only certain steps of the process (e.g., a separate registrar registers the domain name to the intermediary organization and the organization generates and issues the physical mechanism and locks the domain name/account). In other embodiments, the intermediary organization may own and oversee administration of the entire process from beginning to end (e.g., the organization is a registrar that registers the domain name to itself (after permission/request from the customer), then generates and issues the physical mechanism and locks the domain name/account). In most embodiments, in order for this arrangement to work, the customer would not and cannot be the registrant of the domain name.

Returning now to step 310 of FIG. 3, server(s) 110 may store the received data within data storage 130. To accomplish this, server(s) 130 may identify the user inputting the information, possibly by a user id received with the request and identified when the user logged into the control panel. Server(s) 110 may also identify the domain name registered by the user (or other asset) via the control panel or associated with the account from the received request. The user id, any associated accounts or other assets, and if applicable, the identified domain name may be added to the block of data to be stored within and bound to the physical mechanism.

Server(s) 110 may be further configured to identify instructions from the user for authorized transactions. In the example above, the authorized transactions may include selected modifications to the domain name to be stored in and bound to the physical mechanism, which would be required to be transported, delivered, presented and processed prior to executing the authorized domain name modifications.

Server(s) 110 may therefore identify these authorized transactions to be performed and store them in data storage 130, possibly as one or more data records, in association with the identified domain name and/or user account or id. Server(s) 110 may then aggregate the user id, the account, the asset/domain name and/or the authorized transactions into a block of data, to be stored in and bound to the physical mechanism.

In embodiments where the account is a domain name account and/or the asset is a domain name, the authorized transaction may be secured via a domain name change key such as an EPP key. A domain name registry may store the change key associated with the domain name, awaiting authentication of the authorized transaction via the change key prior to authenticating the domain name modifications requested by the user. Server(s) 110 may aggregate the change key together with the existing block of data, in association with the user id, domain name, authorized domain name modifications, etc.

Although associated with the domain name and authorized transactions stored in the database, the change key would only be affixed to and/or stored within the physical mechanism, and would not be stored locally in data storage 130, or in any electronic communication/account that could be intercepted, thereby ensuring that the data cannot be compromised.

The information within the block of data may be encrypted to add an additional layer of security. If implemented in its most basic form, this encryption would use off-the-shelf PKI as a protection mechanism for the data, so it cannot be tampered with. The encrypted block of data may include at least one user authentication credential encoding ownership of the domain name, as well as, in some embodiments, a programmatic lock for the domain name, where the ability to unlock or update the domain name is encoded into the block of data.

In some embodiments, only the change key may be encrypted. In some embodiments, the change key, (which would not be stored in association with an electronic account) may be set to a random value. In other embodiments all data within the block of data may be encrypted, including the user id, asset/domain name, authenticated transactions such as domain name modifications and the EPP key. Any encryption technology now known in the art may be used to encrypt the block of data.

Returning to step 320 of FIG. 3, server(s) 110 may aggregate the block of information in order to affix it to or store it on the physical mechanism. This block of data may be any of the information associated with the user input from the control panel in FIG. 4 and/or associated with the user account.

As seen in step 330 of FIG. 3, the block of data may be integrated into, stored within and/or bound to the physical mechanism rather than being stored in an electronic account, because storing this data block within any electronic account would expose the data block to possible copying, hijacking or other loss of the data, since the security would be no greater than a key or a password. The disclosed invention, therefore, adds an additional layer of security against social engineering, domain hijacking, etc. An unscrupulous individual would be required to physically steal the certificate or USB key from the user in order to change the account and/or assets (e.g., administrator privileges, domain name transfers, etc.) represented by the physical mechanism.

Thus, the physical mechanism may include physical objects capable of displaying or storing the block of data. The simplest version of the physical mechanism may include a printout of the block of data on a sheet of paper. The paper may include printed displays of the user id, the account/asset, the valid requested modifications to be applied to the account or asset and, in domain name related embodiments, the generated string making up the change key. In some embodiments, the paper itself may include a form including requested changes to be made to the domain name or service. This information could be input by the authenticating authority in response to a request to modify the domain name, and validated according to the input data. If authenticated, the requested modifications could be executed. Additional embodiments may present visual or memory based challenge to the user (e.g., CAPTCHA, challenge questions, etc.).

More sophisticated versions of the physical paper described above may include additional layers of security. For example, the integration of the block of data into the physical mechanism, may include a certificate created in such a way to ensure that the physical mechanism isn't forged. Although a physical paper such as a certificate could theoretically be copied, the issuer may protect against physical forgery. By way of analogy, when a forger attempts to counterfeit a $20 bill or bearer bond, the bill or bond is generated using specific identifiable paper and ink, additional flecks of different colored fabric, three dimensional holographic images, etc. Similar techniques may be used on the disclosed physical certificate, thereby creating a high fidelity physical mechanism that is extremely hard to counterfeit.

In an even more sophisticated embodiment of the physical certificate, server(s) 110 may be configured to encode the block of data (possibly after encryption, described above) into a machine readable optical label, such as a UPC, QR or any other bar code readable by a cell phone or other scanning hardware and/or software. The generated machine readable optical label may be printed on and/or affixed to the physical certificate, so that when presented, it may be scanned to retrieve the block of data. (e.g., user id, domain name, valid requested domain name modifications, EPP key, etc.). Server(s) 110 may then read the optical label using the appropriate scanning hardware and/or software. In some embodiments (not shown), a user may scan the bar code via the appropriate device/software as a shortcut around a requirement to enter a username and/or password in order to access frequently used software applications or control panels.

FIG. 6 represents a non-limiting example embodiment of a generated certificate containing the block of data. In this example, the certificate was generated in response to the domain name example.com being registered. The machine readable optical label has been printed on or affixed to the certificate and provides the domain name administrator the ability to apply for a domain name transfer, perform an inter-registrar transfer, change the registrant, perform a routine update of WHOIS or name server information, etc. For these changes to occur, the domain name owner would need to send, deliver and/or present the certificate to be read by a scanning machine operated by the authenticating authority. The QR code may then be scanned, thereby authenticating the user, and the domain name changes put into place.

As previously noted, the physical mechanism may include physical objects. In some embodiments, these physical objects may include physical portable memory, such as a USB key, thumb drive, cell phone, tablet, etc. that may store the block of data independent from server(s) 110 or any other local electronic storage or accounts. The simplest version of the physical mechanism may therefore include the block of data, including the user id, the asset/account, the authenticated requested modifications and/or the change key (as non-limiting examples), being stored, possibly as a simple text or flat file, on the USB key, thumb drive, cell phone, tablet, etc.

The block of data may be bound to any physical portable memory. In some embodiments, the block of data may be converted and/or translated into a format compatible with a physical portable memory in order to bind the block of data and the physical portable memory together. Because these physical electronic devices are readily readable (allowing unscrupulous individuals to remove, copy or hack the data in the block of data) additional security in the form of encryption and binding to the physical object may be employed. For example, server(s) 110 may be configured to encode and encrypt the block of data and integrate it into the physical mechanism as a machine readable optical label (e.g., QR code), which may then be placed into a secure location (e.g., safety deposit box at a bank), with limited physical access. An additional level of security may be achieved by binding the data in the block of data to the device, joining the data to the device in such a way that it cannot be extracted. As a non-limiting example, the block of data may be securely encoded into a phone or USB key, where a hacker could not copy it without corrupting the block of data if removed from the phone.

For example, the block of data may be encrypted on the physical portable memory in such as way that half of a key pair exists on the physical portable memory storage device, while the other half is encoded to that key pair and will only work from that key, so that data in the block of data may not be accessed or copied without the full key pair. In some embodiments, the block of data may be converted and/or translated into a form that requires a randomly generated key to decrypt. In another example the disclosed invention may use technology analogous to RSA token technology, that requires a randomly generated numeric code or PIN for the user, to be authenticated and access the data within the block of data.

The disclosed invention requires transportation, delivery, presentation and processing of the physical mechanism, such as a certificate or USB key bound to the data block, in order to execute the authorized transactions. Therefore, once printed as a certificate or stored on the phone, tablet or other portable memory, the physical mechanism may then be physically sent to the user. The user may receive the block of data, integrated into the physical mechanism, and store it in a secure location (e.g., a safety deposit box).

Figure 7:
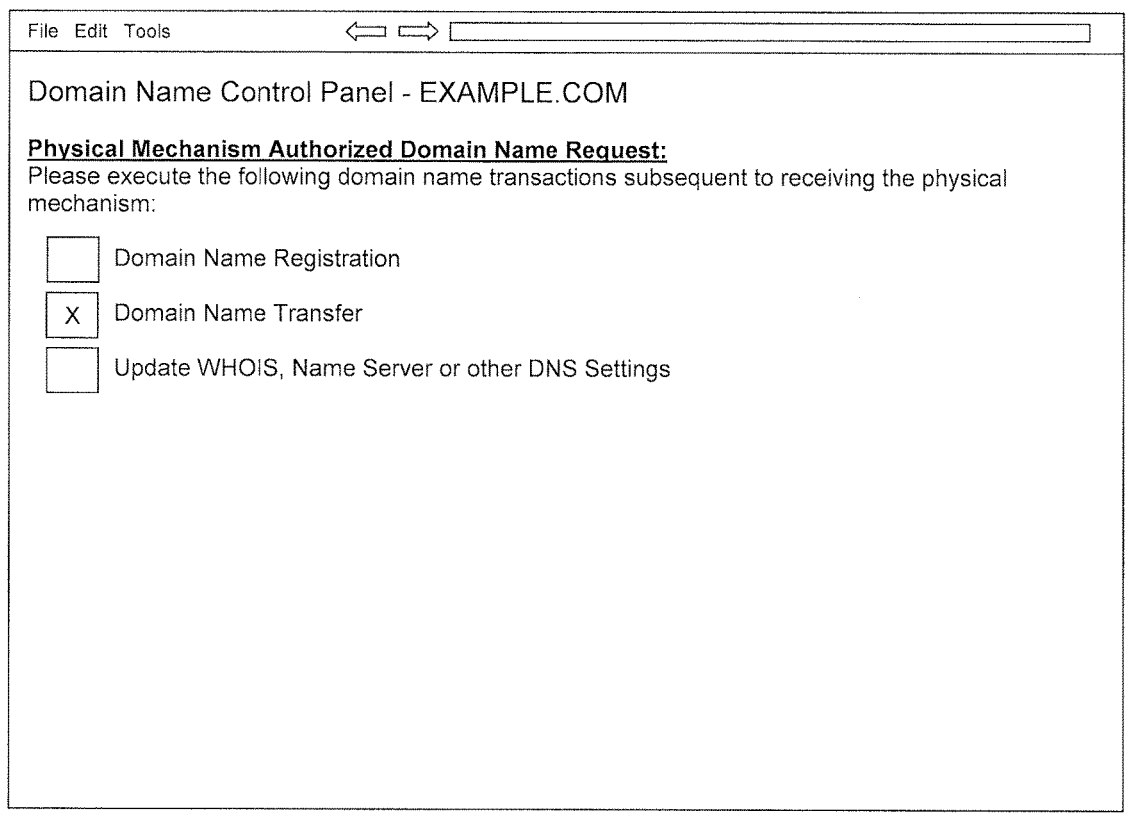
FIG. 7 illustrates an example control panel for account asset protection via a physical mechanism.

In order to request and execute changes to the account/asset/domain name, or otherwise authenticate the owner for other services, the user may access a software, such as a website or mobile app, operated by the authentication authority to request and/or generate the desired modifications to the domain name or other services. In the example seen in FIG. 7, the user may authenticate themselves to the software (possibly using a username and password), identify the domain name or other service for which they are requesting the change, and select the change requested.

To put these modifications to the domain name or other service into effect, the authenticating entity (e.g., a registry, a registrar, the intermediary entity disclosed above, etc.) may require that the physical mechanism accompanies any requested domain name or other service changes, or other requests requiring user authentication. The disclosed system may therefore require the user to present proof of the physical mechanism, and may require that the physical mechanism be physically transmitted and received by the authenticating entity in order to make the requested changes.

The user may access the software operated by the authentication authority and log into a control panel, possibly using a username and password. The software may authenticate the user to the software. The user may then request specific modifications to the domain name or other service. The software may identify the domain name or other account and the requested changes to the domain name or other service.

The software may query the database for the modifications stored in association with the user id and/or domain name or other service in order to validate that the request by the user is a valid request. If the user is authenticated and the requests are valid requests, the software may identify the user's contact information associated with the user id and transmit a request to the user for the physical mechanism using any or all means of contact stored in the database in association with the user. On receipt of these notices, the user may send the physical mechanism to the authenticating authority. The physical mechanism may be received by the authenticating authority. The authenticating authority may then authenticate the physical mechanism.

The physical mechanism may be validated and authenticated using any methods now known or developed in the future to decode a block of information and/or instructions in order for a user, a registrant, a registry, a registrar, etc. to identify the user and domain name or other service, validate that the physical mechanism is authentic (e.g., for certificates, validate the identifiable paper and ink, additional flecks of different colored fabric, three dimensional holographic images, etc.), and/or to validate that no unauthorized changes have been made between the issuance and the presentation of the physical mechanism.

In the simplest of embodiments, where the block of data including the user id, domain or other service id, the modifications to the domain or other service and the change key (where applicable) is printed on the certificate or stored within the physical portable memory, a user working for the authentication authority or an optical character recognition software may enter the data block into server(s) 110 using any known means of data entry in the art.

In embodiments including a bar code, once the physical mechanism is received from the user, the bar code may be scanned as a form of data entry to transmit the block of data to server(s) 110. Where the block of data was encrypted prior to encoding it onto the physical mechanism, server(s) 110 may decrypt the data in the data block, possibly by applying half of a key in a key pair matching the half of the key used to encrypt the data block.

Server(s) 110 may then decode the block of data by identifying, within the data block, the user id, the domain name or other service id, and the modifications to the domain name or other service requested and authorized by the user. In some embodiments, the encoded block may also contain all information the registrar wishes to encode to validate that no unauthorized changes have been made between the issuance and receipt of the physical mechanism.

In embodiments including a change key, the change key may be identified within the block of data. Where the EPP key has been set at a random value, the random value may be matched to the valid value and may be authenticated using the EPP key stored at the registry, prior to executing the instructions for changes. Once the preceding steps have been completed, the requested modifications to the account or asset/domain name may be executed.

Changes to the account and/or asset may take place at various levels within the system. As non-limiting examples, At a high level, the disclosed invention could apply to any account, software or software control panel, or frequent transaction, including each individual access to a system login, administrative accounts, access to any related software applications or products, entry of a username or password, or any other frequent access of an account and/or asset by the user. However, user's would need to understand that each daily or hourly access would require the transportation, delivery, presentation and/or processing of the physical mechanism.

Therefore, in some embodiments, use of the physical mechanism may be limited to services that are only accessed at non-regular intervals. In some embodiments, user of the physical mechanism may be applied to an account locked to the user until the physical mechanism is applied. For example, when the secure physical mechanism is requested, server(s) 110 may generate and store data for a separate account administrated by the user, the account being locked pending issuance to the user, a request to access the account by the user, and receipt, by an authenticating authority, of the physical mechanism. As a non limiting example, this account may be a domain name account that the user does not want updated without authentication via the secure physical mechanism.

In some embodiments, the account may be unlocked only for a specific period of time (e.g., 24 hours) for the user to make changes within the locked account. In some embodiments, the amount of time the account is unlocked may be set by the user.

The most granular application of the physical mechanism may be to specific transactions within a user account. The non-limiting examples disclosed herein apply specifically to domain name administration transactions, such as a domain name's registration, transfer, inter-registrar transfer, sale, registrant change, proof of ownership, routine update of WHOIS or name server settings, DNS settings, etc. However, these examples should in no way limit the scope of the disclosed invention, which may include any transaction associated with a user account and/or asset and which the user wants to be secured.

Once the physical mechanism is received and services are performed, the authenticating entity may generate a new physical mechanism, which may then be sent to the system user as proof of ownership and legal rights associated with the account. In some embodiments, this new physical mechanism may include, within the block of data, any updates made since issuance of the original physical mechanism.

In some embodiments, the authenticating authority and/or interim organization may maximize the level of security for the asset, such as a domain name, by exclusively recognizing the physical mechanism as the only mechanism that restores access to the domain name and/or the domain name account. In these embodiments, no other authentication methods, such as production of a drivers license, passport, signed affidavit, etc. would be sufficient to unlock the account. However, in other embodiments, the authentication authority and/or interim organization may provide a type of safety net against permanent loss of the physical mechanism, and by extension, the registered domain name.

In the interest of maximum provided security, the disclosed invention may provide a recovery policy and procedure which makes it difficult, but not impossible to recover the domain name without the physical mechanism. As an example why such a security mechanism is important, in embodiments involving a domain name, the domain names in the locked account may have value not only in themselves, but also in: the businesses they represent; trademarks associated with that business or domain name; the website representing that business, domain name based trademarks; etc. Thus, if a domain name were to become permanently lost, unlike a monetary bearer bond, the loss could be irreplaceable. Because the embodiments disclosed herein tie the ownership of a domain name to the physical mechanism, if the physical mechanism were to be lost or destroyed (e.g., a certificate destroyed in a fire), this loss could result in the domain name being registered by another entity and could be devastating to the domain name owner and their business if the domain name were permanently lost.

The disclosed system may therefore provide methods for keeping ownership of the domain name safe via multiple mechanisms/options available to the domain name owner. In one embodiment, the customer may avoid permanent loss of their domain name (through loss of the physical mechanism) by implementing a default transfer method built into the system. This option may receive, from the customer, a selection to specify a default case to execute for the domain name if the intermediary service organization is not contacted by the customer before expiration of the organization's service. This default case may also apply if the customer loses the physical mechanism. In some embodiments, this default case may automatically unlock the domain name at the end of the service agreement. In these embodiments, the service agreement may include agreement by the customer to accept responsibility for the account automatically unlocking.

In other embodiments, the service itself may end, but may do so previous to the expiration of the domain name. For example, the customer may set the expiration date of the service, so that the service expires 5 days prior to the expiration of the domain name, thereby providing a window in which the customer could re-register the domain name. The customer would then be provided a window of time in which they could restore the domain name via normal means. In some embodiments, the system may be configured to automatically re-register the domain name at the end of the expiration date of the service. In some embodiments, the customer may select to set an alert so that they know that the service will be ending soon.

The steps included in the embodiments illustrated and described in relation to FIGS. 1-7 are not limited to the embodiment shown and may be combined in several different orders and modified within multiple other embodiments. Although disclosed in specific combinations within these figures, the steps disclosed may be independent, arranged and combined in any order and/or dependent on any other steps or combinations of steps.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising at least one hardware processor executing instructions on a server computer coupled to a network, the instructions causing the server computer to:
   receive a first transmission from a website control panel encoding a request for a physical certificate authenticating a user to transfer a domain name, the first transmission further encoding a user identification, a domain name identification and domain name transfer instructions;
   print the physical certificate, and on the physical certificate, a quick response (QR) code encoding the user identification, the domain name identification, an extensible provisioning protocol (EPP) key and the domain name transfer instructions;
   programmatically lock an account for the domain name against modification;
   receive a second transmission from the website control panel encoding a request to execute a transfer of the domain name;
   receive a scanned data from a scanning device, the scanned data comprising the user identification, the domain name identification, the EPP key and the domain name transfer instructions encoded within the QR code;
   programmatically unlock at least one administrative function of the account;
   authenticate, via the EPP key, the transfer of the domain name; and
   execute the transfer of the domain name.

2. The system of claim 1, wherein prior to printing the physical certificate, the server computer:
   sets the EPP key to a random value; and
   encrypts, using a key pair, the user identification, the domain name identification, the EPP key and the domain name transfer instructions.

3. The system of claim 1, wherein the server computer:
   stores, within a database coupled to the network in association with the user identification and the domain name identification, at least one data record comprising the domain name transfer instructions; and
   responsive to receiving the second transmission, verify that the at least one data record matches the domain name transfer instructions.

4. The system of claim 1, wherein the server computer:
   stores, within a database coupled to the network in association with the user identification, at least one data record comprising a user contact; and
   responsive to receiving the second transmission, transmit, to the user contact, a request for the physical certificate.

5. The system of claim 1, wherein the user identification, the domain name identification, the EPP key and the domain name transfer instructions are stored on:
   a USB drive; or
   a cell phone.

6. The system of claim 1, wherein the EPP key is not stored on the server computer.

7. A system, comprising at least one hardware processor executing instructions on a server computer coupled to a network, the instructions causing the server computer to:
   receive a first transmission encoding a request for a physical mechanism authenticating a user to update an electronic asset, the first transmission further encoding a user identification, an electronic asset identification including a domain name and electronic transaction instructions including instructions for transferring a domain name;
   generate the physical mechanism, and affixed to, or stored on, the physical mechanism, a block of data including a quick response (QR) code encoding the user identification, the electronic asset identification, a change key including an extensible provisioning protocol (EPP) key, and the electronic transaction instructions;
   programmatically lock an account for the electronic asset against modification;
   receive a second transmission encoding a request to execute the electronic transaction instructions;
   receive a data entry of the block of data from the physical mechanism, the data entry comprising the user identification, the electronic asset identification, the change key and the electronic transaction instructions encoded within the physical mechanism;
   programmatically unlock at least one administrative function of the account;
   authenticate a transaction for the electronic asset via the change key; and
   execute the electronic transaction instructions.

8. The system of claim 7, wherein prior generating the physical mechanism the server computer:
   sets the change key to a random value; and
   encrypts the block of data using a key pair.

9. The system of claim 7, wherein the server computer:
   stores, within a database coupled to the network in association with the user identification and the electronic asset identification, at least one data record comprising the electronic transaction instructions; and
   responsive to receiving the second transmission, verify that the at least one data record matches the electronic transaction instructions.

10. The system of claim 7, wherein the server computer:
    stores, within a database coupled to the network in association with the user identification, at least one data record comprising a user contact; and
    responsive to receiving the second transmission, transmit, to the user contact, a request for the physical mechanism.

11. The system of claim 7, wherein the physical mechanism comprises:
a printed certificate; or
a USB drive; or
a cell phone.

12. The system of claim 7, wherein the block of data is encoded into a machine readable optical label and is affixed to or stored within the physical mechanism.

13. A method, comprising:
receiving, by a server computer coupled to a network, a first transmission encoding a request for a physical mechanism authenticating a user to update an electronic asset or a transaction for the electronic asset, the first transmission further encoding a user identification, an electronic asset identification including a domain name and electronic transaction instructions including instructions for transferring a domain name;
generating, by the server computer, the physical mechanism, and affixed to, or stored on, the physical mechanism, a block of data including a quick response (QR) code encoding the user identification, the electronic asset identification, a change key including an extensible provisioning protocol (EPP) key, and the electronic transaction instructions;
programmatically locking, by the server computer, an account for the electronic asset against modification;
receiving, by the server computer, a second transmission encoding a request to execute the electronic transaction instructions;
receiving, by the server computer, a data entry of the block of data from the physical mechanism, the data entry comprising the user identification, the electronic asset identification, the change key and the electronic transaction instructions encoded within the physical mechanism;
programmatically unlocking, by the server computer, at least one administrative function of the account;
authenticating, by the server computer, the transaction for the electronic asset via the change key; and
executing, by the server computer, the update to the electronic asset.

14. The method of claim 13, further comprising the steps, prior to generating the physical mechanism, of:
setting, by the server computer, the change key to a random value; and
encrypting, by the server computer, the block of data using a key pair.

15. The method of claim 13, further comprising the steps of:
storing, by the server computer, within a database coupled to the network in association with the user identification and the electronic asset identification, at least one data record comprising the electronic transaction instructions; and
responsive to receiving the second transmission, verifying, by the server computer, that the at least one data record matches the electronic transaction instructions.

16. The method of claim 13, further comprising the steps of:
storing, by the server computer, within a database coupled to the network in association with the user identification, at least one data record comprising a user contact; and
responsive to receiving the second transmission, transmitting, by the server computer, to the user contact, a request for the physical mechanism.

17. The method of claim 13, wherein the physical mechanism comprises:
a printed certificate; or
a USB drive; or
a cell phone.

18. The method of claim 13, wherein the block of data is encoded into a machine readable optical label and is affixed to or stored within the physical mechanism.

* * * * *